(12) United States Patent
Clouse

(10) Patent No.: US 9,404,580 B2
(45) Date of Patent: Aug. 2, 2016

(54) DUPLEX FINGER SEAL FOR JOINTS WITH HIGH RELATIVE DISPLACEMENT

(75) Inventor: Brian Ellis Clouse, Saugus, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 495 days.

(21) Appl. No.: 13/445,998

(22) Filed: Apr. 13, 2012

(65) Prior Publication Data

US 2013/0270777 A1 Oct. 17, 2013

(51) Int. Cl.
| | |
|---|---|
| *F16J 15/02* | (2006.01) |
| *F16J 15/08* | (2006.01) |
| *F01D 11/12* | (2006.01) |
| *F01D 25/24* | (2006.01) |

(52) U.S. Cl.
CPC ............ *F16J 15/0887* (2013.01); *F01D 11/12* (2013.01); *F01D 25/246* (2013.01); *F16J 15/0893* (2013.01); *F05D 2230/642* (2013.01); *F05D 2240/11* (2013.01); *F05D 2250/75* (2013.01); *F05D 2260/37* (2013.01); *F05D 2260/38* (2013.01); *Y10T 29/49826* (2015.01)

(58) Field of Classification Search
USPC ......... 277/630, 637, 644, 648, 649, 650, 654; 415/134–135, 139
See application file for complete search history.

(56) References Cited

U.S. PATENT DOCUMENTS

| | | | |
|---|---|---|---|
| 1,746,598 A | 2/1930 | Ljungstrom | |
| 2,701,155 A * | 2/1955 | Estel, Jr. ..................... | 277/555 |
| 3,368,819 A | 2/1968 | Otto | |
| 3,869,222 A * | 3/1975 | Rahnke et al. ................ | 415/134 |
| 4,022,948 A | 5/1977 | Smith et al. | |
| 4,645,217 A * | 2/1987 | Honeycutt et al. ........... | 277/555 |
| 5,024,450 A | 6/1991 | Hawley et al. | |
| 5,071,138 A | 12/1991 | Mackay et al. | |
| 5,221,096 A | 6/1993 | Heldreth et al. | |
| 5,782,294 A | 7/1998 | Froemming et al. | |
| 6,503,051 B2 | 1/2003 | Predmore | |
| 6,632,217 B2 * | 10/2003 | Harper et al. .............. | 604/892.1 |
| 7,093,837 B2 * | 8/2006 | Parker et al. .................. | 277/630 |
| 7,594,792 B2 * | 9/2009 | Audeon et al. ................ | 415/135 |
| 7,901,186 B2 | 3/2011 | Cornett et al. | |

(Continued)

FOREIGN PATENT DOCUMENTS

GB 2136508 A 9/1984

OTHER PUBLICATIONS

International Search Report and Written Opinion for related International Application No. PCT/US13/23599; report dated Apr. 15, 2013.

(Continued)

*Primary Examiner* — Vishal Patel
(74) *Attorney, Agent, or Firm* — Cantor Colburn LLP

(57) ABSTRACT

The sealing apparatus and method of assembling the same is disclosed. The sealing apparatus may comprise a resilient member and a sealing member. The resilient member may define a cavity having a closed end and an open end. The resilient member may include a first wall having a first inner sealing surface and a second wall having a second inner sealing surface. The first and second walls may be joined at the closed end. The sealing member may be disposed at least partially in the cavity in sealing engagement with the first and second inner sealing surfaces. The sealing member may comprise an upper plurality of layered finger seals and a lower plurality of layered finger seals.

20 Claims, 3 Drawing Sheets

(56) References Cited

U.S. PATENT DOCUMENTS

| | | | |
|---|---|---|---|
| 8,657,563 B2 * | 2/2014 | Hayton | 415/108 |
| 2005/0082768 A1 * | 4/2005 | Iguchi et al. | 277/591 |
| 2005/0179215 A1 * | 8/2005 | Kono | 277/628 |
| 2006/0245924 A1 * | 11/2006 | Audeon et al. | 415/214.1 |
| 2008/0159850 A1 * | 7/2008 | Tholen et al. | 415/139 |
| 2011/0274534 A1 * | 11/2011 | Hayton | 415/110 |

OTHER PUBLICATIONS

EP Supplementary European Search Report for Application No. 13775682.1-1751; Dated: Nov. 3, 2015 ; 8 pgs.

* cited by examiner

DUPLEX FINGER SEAL FOR JOINTS WITH HIGH RELATIVE DISPLACEMENT

TECHNICAL FIELD OF THE DISCLOSURE

The present disclosure relates to seals used to provide sealing against pressure differentials between two parts that experience relative displacement and, more particularly, relates to finger seals.

BACKGROUND OF THE DISCLOSURE

In various industrial applications, the interface between two parts may experience displacement due to the motion of one part or both parts relative to the other part. This displacement may be axial, radial or angular. For example, in turbines, such as gas turbines and the like used in various static and dynamic applications, displacement between some parts may arise due to the pressure differentials that occur during operation. When the amplitude of such displacement is too large for other types of seals to accommodate and/or the temperature is too high for non-metallic seals, finger seals are used to provide sealing against pressure differences (leakage of air) between two parts. Such finger seals may be used in turbine engines at the augmentor liner interface, the nozzle liner closeouts and nozzle liner edge seals, among other places.

To maintain contact and seal effectively, finger seals rely on spring loading and pressure differentials that occur in one direction. If the pressure reverses, the fingers of the finger seal may lift off the parts that they mate with and lose sealing ability. Accordingly, it would be beneficial if an improved sealing apparatus was developed.

SUMMARY OF THE DISCLOSURE

In accordance with one aspect of the present disclosure, a sealing apparatus is disclosed. The sealing apparatus may comprise a resilient member and a sealing member. The resilient member may define a cavity having first and second opposed inner sealing surfaces. The sealing member may include a plurality of layered finger seals. The sealing member may have a back portion, an upper turned portion and a lower turned portion. The upper and lower turned portions may extend in opposing directions and may each be biased against one of the inner sealing surfaces of the resilient member.

In accordance with another aspect of the present disclosure, a sealing apparatus is disclosed. The sealing apparatus may comprise a resilient clamp and a dual-hook shaped sealing member. The clamp may define a cavity having a closed end and an open end. The clamp may include a first wall having a first inner sealing surface and a second wall having a second inner sealing surface. The first and second walls may be joined at the closed end. The dual-hook shaped sealing member may be disposed at least partially in the cavity in sealing engagement with the first and second inner sealing surfaces. The sealing member may comprise an upper plurality of layered finger seals and a lower plurality of layered finger seals.

In accordance with yet another aspect of the present disclosure, method of assembling a sealing apparatus is disclosed. The method may comprise providing a resilient clamp and a sealing member. The clamp may define a cavity having a closed end and an open end, and may include a first wall having a first inner sealing surface and a second wall having a second inner sealing surface. The first and second walls of the clamp may be joined at the closed end. The sealing member may comprise an upper plurality of layered finger seals and a lower plurality of layered finger seals. The upper plurality may have an upper back portion and an upper turned portion, and the lower plurality may have a lower back portion and a lower turned portion. The upper and lower back portions may be disposed adjacent to each other and the upper and lower turned portions may be opposed to each other. The method further includes lodging the sealing member into the cavity of the clamp until the upper turned portion is biased against first inner sealing surface and the lower turned portion is biased against the second inner sealing surface.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
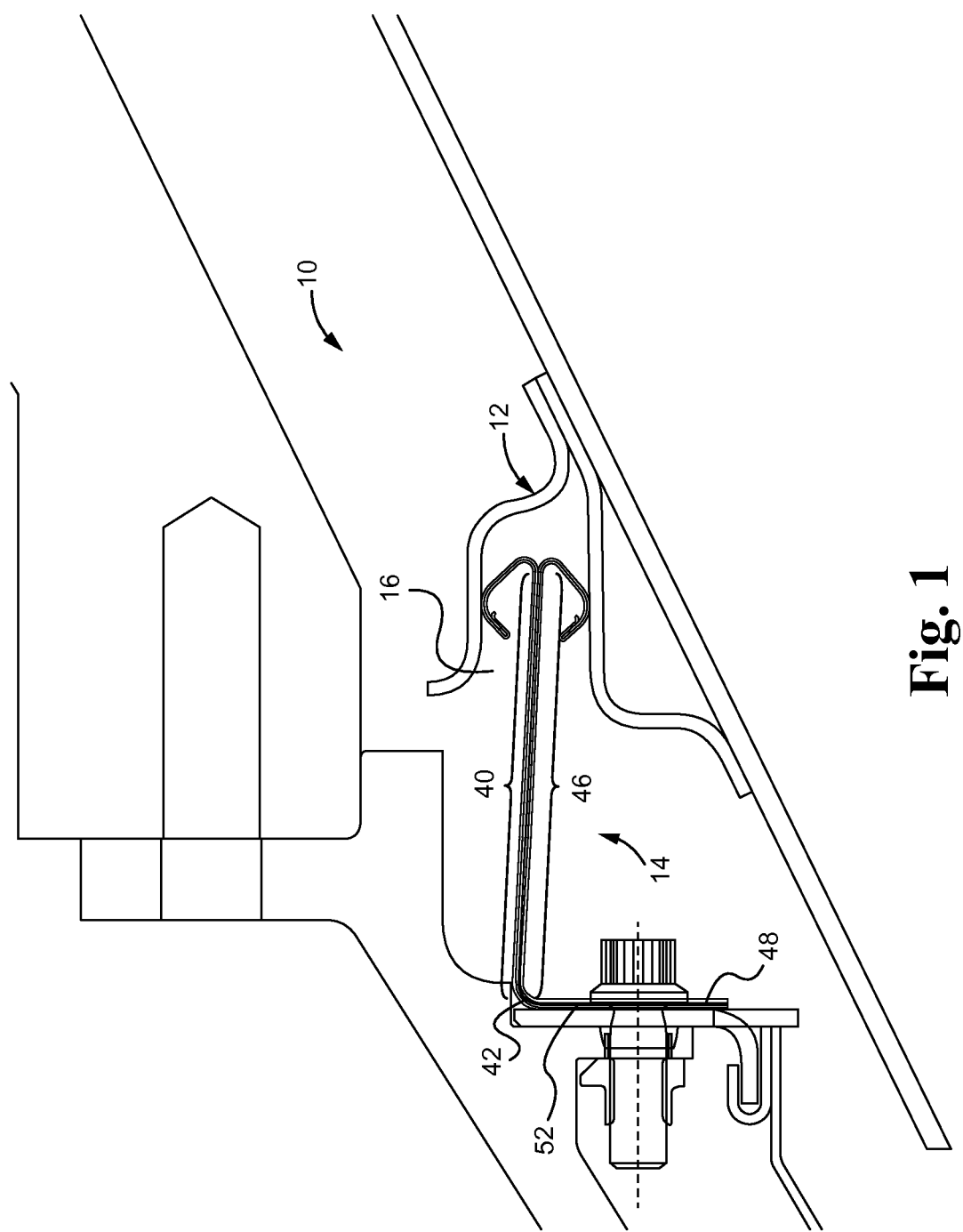
FIG. 1 is a schematic illustration of an embodiment of a finger seal apparatus, in accordance with the present disclosure.
Figure 2:
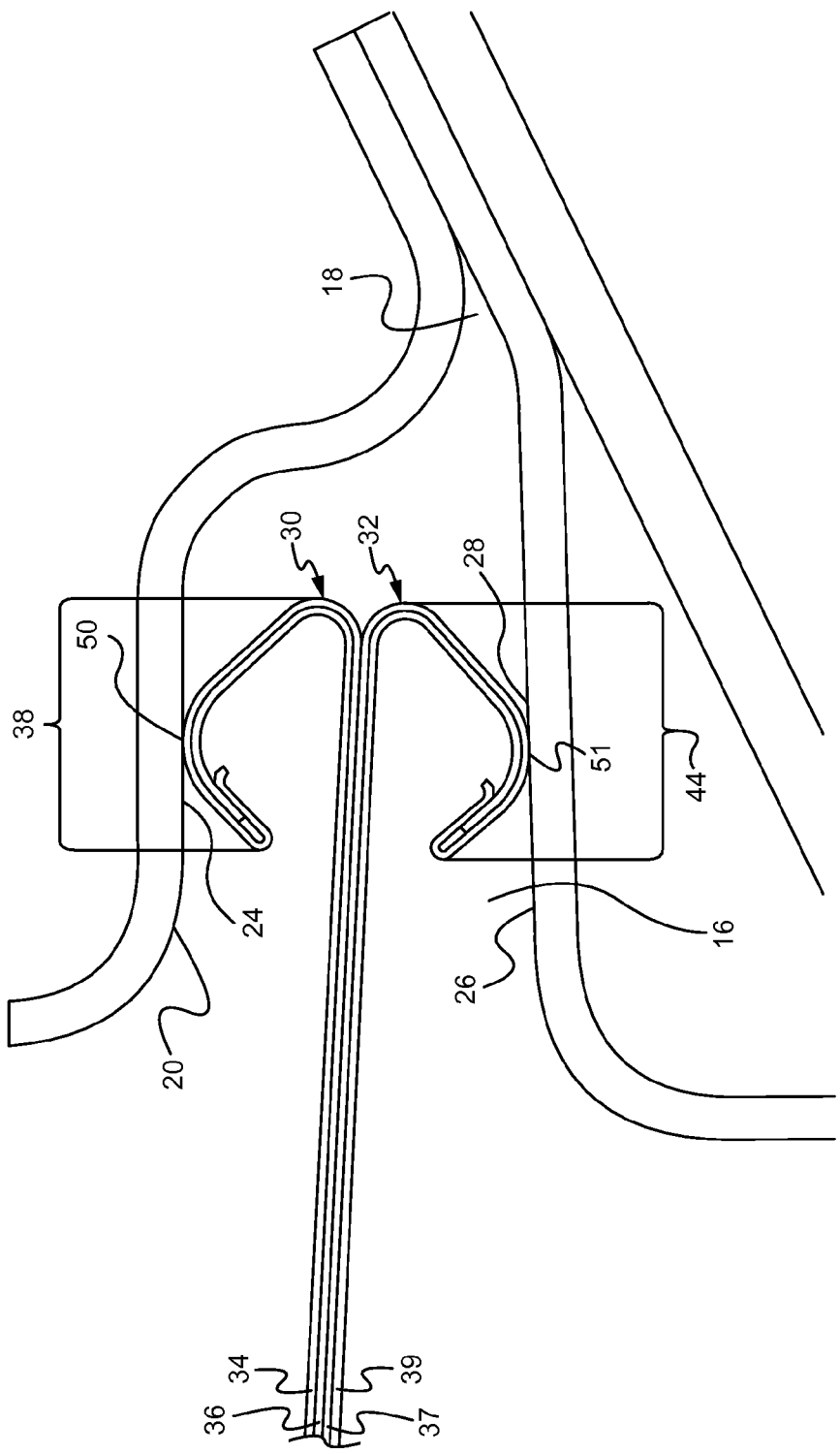
FIG. 2 is an enlarged detail of the finger seal apparatus of FIG. 1.

Referring to FIGS. 1-2, an illustration of an exemplary embodiment of a sealing apparatus 10 is shown. As shown, the sealing apparatus 10 may include a resilient member 12 and a sealing member 14. The resilient member 12 may define a cavity 16 having a closed end 18 and an open end 20. The resilient member may include a first wall 22 having a first inner sealing surface 24 and a second wall 26 having a second inner sealing surface 28. The first and second walls 22, 26 may be joined at the closed end 18. In one embodiment the resilient member may be a clamp. In one embodiment the resilient member 12 may be a fish mouthed clamp, as is known in the art. In an embodiment, the resilient member 12 may be of a metallic material and may be stiff enough to limit distortion under pressure.

The sealing member 12 may be disposed at least partially in the cavity 16 in sealing engagement with the first and second sealing surfaces 24, 28 of the resilient member 12. In an embodiment, the sealing member 12 may be generally shaped like a dual hook. More specifically, the sealing member 14 may comprise an upper plurality of finger seals 30 and a lower plurality of finger seals 32.

The upper plurality 30 may include a first finger seal 34 and a second finger seal 36. In an embodiment, the first and second finger seals 34, 36 may be nested together. The upper plurality of finger seals 30 may have an upper turned portion 38 with a first outer sealing surface 50 and an upper back portion 40. The upper plurality of finger seals 30 may also have an upper leg portion 42. In some embodiments, the upper leg portion 42 may be disposed generally perpendicular to the upper back portion 40.

The lower plurality of finger seals 32 may include a third finger seal 37 and a fourth finger seal 39. In an embodiment, the third and fourth finger seals 37, 39 may be nested together. The lower plurality of finger seals 32 may have a lower turned portion 44 with a second outer sealing surface 51 and a lower back portion 46. In some embodiments, the lower plurality of finger seals 32 may also have a lower leg portion 48. The lower leg portion 48 may be disposed generally perpendicular to the lower back portion 46. In one embodiment, the upper and lower pluralities of finger seals 30, 32 may be secured together at an end 52 of the sealing member distal from the upper and lower turned portions 38, 44. The upper and lower pluralities of finger seals 30, 32 may be secured together by a bolt, clamp, or the like.

In an embodiment the upper and lower back portions 40, 46 may be adjacent to each other, either directly or indirectly, and the upper and lower turned portions 38, 44 may extend outward in opposing directions toward the sealing surfaces 24, 28 of the resilient member 12. Hence, the sealing member 14 may be shaped like a dual hook or anchor. In an embodiment the upper and lower leg portions may also be adjacent to each other and/or nested tougher. In some embodiments a layer of high temperature resistant cloth, such as Nextel™, or metal fabric, may be sandwiched between the indirectly adjacent upper and lower back portions 40, 46.

The upper turned portion 38 together with a part of the upper back portion 40 may define a generally triangular shape. The upper turned portion 38 may be biased against the first sealing surface 24 of the resilient member 12. More specifically, a the first outer sealing surface 50 of the upper turned portion 38 may be biased against the first inner sealing surface 24 of the resilient member 12.

Likewise, in an embodiment, the lower turned portion 44 together with a part of the lower back portion 46 may also define a generally triangular shape. The lower turned portion 44 may be biased against the second sealing surface 28 of the resilient member 12. More particularly, the second outer sealing surface 51 of the lower turned portion 44 may be biased against the second inner sealing surface 28 of the resilient member 12.

As is known in the art, each finger seal 34, 36, 37, 39 may each include a plurality of fingers 54. The fingers of the finger seals 34, 36, 37, 39 may be made of a metallic material. In some embodiments the fingers may be metal strips. The finger seals 34, 36 in the upper plurality of finger seals 30 may be layered and positioned such that the fingers 54 of one finger seal are offset from the fingers 54 of another finger seal in the upper plurality 30. For example, the first finger seal 34 and the second finger seal 36 may be layered such that the fingers 54 of the second finger seal 36 are offset from the fingers 54 of the first finger seal 34.

Figure 3:
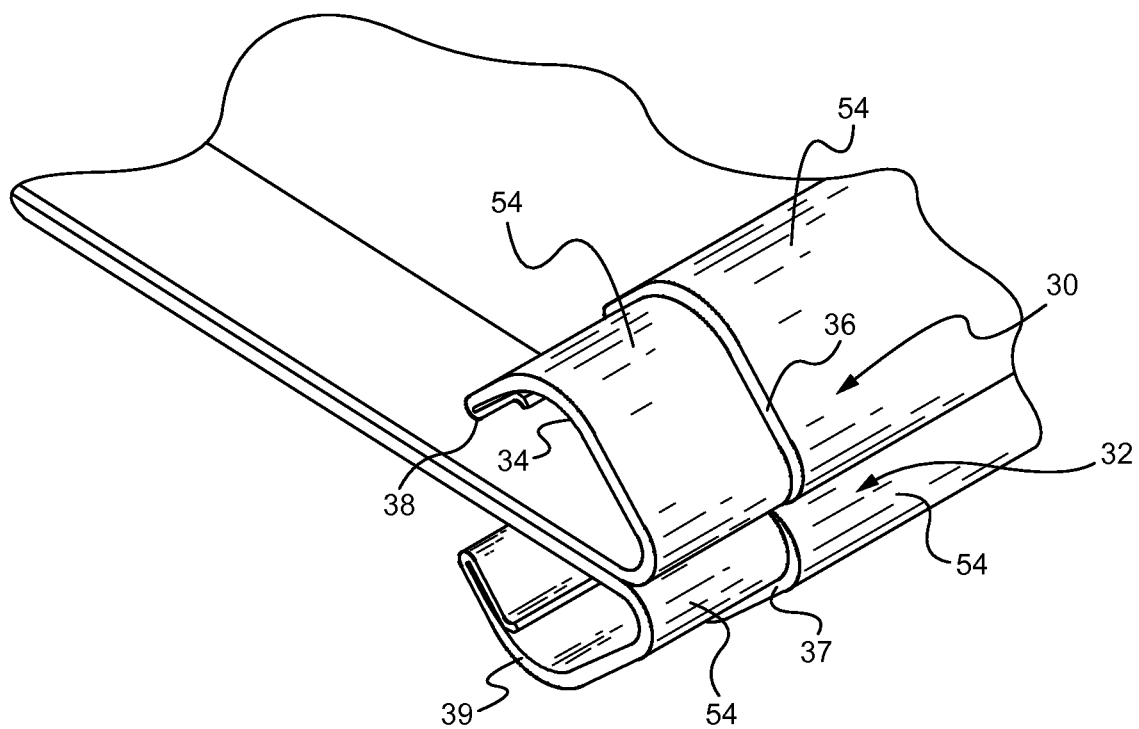
FIG. 3 is a detailed perspective view of a portion of the finger seal of FIG. 2.

FIG. 3 illustrates one embodiment of such an arrangement as described above. In FIG. 3 part of an exemplary upper turned portion 38 is shown. The first finger seal 34 is nested in the second finger seal 36. The fingers 54 of the first finger seal 34 are offset from the fingers 54 of the second finger seal 36.

Similarly, the finger seals in the lower plurality of finger seals 32 may be layered and positioned such that the fingers 54 of one finger seal are offset from the fingers 54 of a different finger seal in the lower plurality 32. For example, the third finger seal 37 and the fourth finger seal 39 may be layered such that the fingers 54 of the third finger seal 37 are offset from the fingers of the fourth finger seal 39.

In FIG. 3 part of an exemplary lower turned portion 44 is also shown. The fourth finger seal 39 is nested in the third finger seal 37. The fingers 54 of the third finger seal 37 are offset from the fingers 54 of the fourth finger seal 39.

INDUSTRIAL APPLICABILITY

In general, the present disclosure sets forth a sealing apparatus 10 for use with industrial applications in which the pressure is not constant or reverses across the sealing member 14. A method of assembling the sealing apparatus 10 described above is disclosed.

The method comprises providing the resilient member 12 and the sealing member 14. As discussed above, the resilient member 12 may define a cavity 16 having a closed end 18 and an open end 20. The resilient member 12 may include a first wall 22 having a first inner sealing surface 24 and a second wall 26 having a second inner sealing surface 28. The first and second walls 22, 26 may be joined at the closed end 18. The resilient member 12 may be mounted to a first support surface.

The method further includes providing a sealing member 14. The sealing member 14 may comprise an upper plurality of layered finger seals 30 and a lower plurality of layered finger seals 32. The upper plurality 30 may have an upper back portion 40 and an upper turned portion 38. The lower plurality 32 may have a lower back portion 46 and a lower turned portion 44. The upper and lower back portions 40, 46 may in some embodiments, be directly adjacent to each other. In other embodiments a layer of high temperature resistant cloth, such as Nextel™, or metal fabric, may be sandwiched between the indirectly adjacent upper and lower back portions 40, 46. The upper and lower turned portions 38, 44 may be opposed to each other.

The method further includes forcefully lodging the sealing member 14 into the cavity 16 of the resilient member 12 until the upper turned portion 38 is biased against first inner sealing surface 24 of the cavity 16 and the lower turned portion 44 is biased against the second inner sealing surface 28 of the cavity 16. The method further includes securing, at an end 52 distal from the upper and lower turned portions 38, 44, the upper and lower pluralities of fingers seals 30, 32 to a second surface.

The sizing of the cavity 16 of the resilient member 12 in relation to the sealing member 14 to produce an interference fit causes downward pressure on the upper back portion 40 and upward pressure on the lower back portion 46, thus sealing the upper and lower back portions 40, 46 together. More specifically, once assembled and installed, downward pressure is exerted on the upper back portion 40 of the upper plurality of finger seals 30 by the spring load provided by the engagement of the first wall 22 of the resilient member 22 with the upper turned portion 38. Likewise, upward pressure is exerted on the lower back portion 46 of the lower plurality of finger seals 32 by the spring load provided by the engagement of the second wall 26 of the resilient member 12 with the lower turned portion 44. Securing, at an end 52 distal from the upper and lower turned portions 38, 44, the upper and lower pluralities of fingers seals 30, 32 together provides additional stability and sealing force between the upper and lower plurality of finger seals 30, 32.

During use, when air pressure is higher on the side of the sealing member 14 on which the upper back portion 40 is disposed, the higher air pressure not only increases the load provided by the upper back portion 40 on the lower back portion 46 (that is on the other side of the sealing member 14), it also increase the load on the upper turned portion 38 against the first inner sealing surface 24 of the resilient member 12. Thus maintaining the sealing apparatus 10 against leakage between the fingers 54 of the upper plurality of finger seals 30. The fingers 54 of the lower plurality of finger seals 32 add to the contact load provided on the higher air pressure side by maintaining their spring loaded interference fit on the opposite side of the cavity 16 (second inner sealing surface 28).

When pressure reverses and air pressure is higher on the side of the sealing member 14 on which the lower back portion 46 is disposed, the higher air pressure not only increases the load provided by the lower back portion 46 on the upper back portion 40 (that is on the other side of the sealing member 14), it also increase the load on the lower turned portion 44 against the second inner sealing surface 28 of the resilient member 12. Thus maintaining the sealing apparatus 10 against leakage between the fingers 54 of the lower plurality of finger seals 32. The fingers 54 of the upper plurality of finger seals 30 add to the contact load provided on the higher air pressure side by maintaining their spring loaded interference fit on the opposite side of the cavity 16 (first inner sealing surface 24).

While only certain embodiments have been set forth, alternatives and modifications will be apparent from the above description to those skilled in the art. These and other alternatives are considered equivalents and within the spirit and scope of this disclosure and the appended claims.

What is claimed is:

1. A sealing apparatus comprising:
    a resilient clamp mounted to a first member and defining a cavity having a closed end and an open end, the clamp including a first wall having a first inner sealing surface and a second wall having a second inner sealing surface facing the first inner sealing surface, the first and second walls joined at the closed end; and
    a sealing member including a plurality of layered finger seals, the sealing member having a back portion, an upper arcuate portion and a lower arcuate portion, the upper and lower arcuate portions extending in opposing directions and each biased against one of the inner sealing surfaces of the resilient clamp, and the layered finger seals comprising an L shape including perpendicular sections, one of the perpendicular sections being mounted to a second member.

2. The sealing apparatus of claim 1, in which the plurality of layered finger seals comprises a first finger seal and a second finger seal and each of the first and second finger seals includes a plurality of fingers, wherein the fingers of the first finger seal are offset from the fingers of the second finger seal.

3. The sealing apparatus of claim 2, wherein the fingers are metal.

4. The sealing apparatus of claim 2, wherein at least a portion of the first finger seal and the second finger seal are nested together.

5. The sealing apparatus of claim 2, in which the plurality of layered finger seals further comprises a third finger seal and a fourth finger seal and each of the third and fourth finger seals including a plurality of fingers, wherein the fingers of the third finger seal are offset from the fingers of the fourth finger seal.

6. The sealing apparatus of claim 5, wherein at least a portion of the third finger seal and the fourth finger seal are nested together.

7. The sealing apparatus of claim 5, wherein the resilient member is metal.

8. A sealing apparatus comprising:
    a resilient clamp mounted to a first member and defining a cavity having a closed end and an open end, the clamp including a first wall having a first inner sealing surface and a second wall having a second inner sealing surface facing the first inner sealing surface, the first and second walls joined at the closed end; and
    a dual-hook shaped sealing member disposed at least partially in the cavity in sealing engagement with the first and second inner sealing surfaces, the sealing member comprising an upper plurality of layered finger seals and a lower plurality of layered finger seals, and the layered finger seals comprising an L shape including perpendicular sections, one of the perpendicular sections being mounted to a second member.

9. The sealing apparatus of claim 8, wherein the upper plurality has an upper back portion and an upper turned portion and the lower plurality has a lower back portion and a lower turned portion, the lower back portion adjacent to the upper back portion.

10. The sealing apparatus of claim 9, wherein the upper turned portion is biased against the first inner sealing surface and the lower turned portion is biased against the second inner sealing surface.

11. The sealing apparatus of claim 9, in which the upper plurality of layered finger seals comprises a first finger seal and a second finger seal and each of the first and second finger seals includes a plurality of fingers, wherein the fingers of the first finger seal are offset from the fingers of the second finger seal.

12. The sealing apparatus of claim 11, in which the lower plurality of layered finger seals comprises a third finger seal and a fourth finger seal and each of the third and fourth finger seals includes a plurality of fingers, wherein the fingers of the third finger seal are offset from the fingers of the fourth finger seal.

13. The sealing apparatus of claim 12, wherein the fingers are a metallic material.

14. The sealing apparatus of claim 9, wherein the second back portion is nested in the first back portion.

15. The sealing apparatus of claim 9, wherein the upper and lower pluralities of finger seals are secured together at an end of the sealing apparatus that is distal from the upper and lower turned portions.

16. The sealing apparatus of claim 9, wherein the clamp is a metallic material.

17. The sealing apparatus of claim 9, wherein a portion of the upper plurality of finger seals is generally triangular in shape and biased against the first inner sealing surface.

18. The sealing apparatus of claim 17, wherein a portion of the lower plurality of finger seals is generally triangular in shape and biased against the second inner sealing surface.

19. A method of assembling a sealing apparatus, the method comprising:
    providing a resilient clamp mounted to a first member and defining a cavity having a closed end and an open end, the clamp including a first wall having a first inner sealing surface and a second wall having a second inner sealing surface facing the first inner sealing surface, the first and second walls joined at the closed end;
    providing a sealing member, the sealing member comprising a plurality of layered finger seals, the sealing member having a back portion, an upper arcuate portion and a lower arcuate portion, the upper and lower arcuate portions extending in opposing directions, and wherein the layered finger seals comprising an L shape including perpendicular sections, one of the perpendicular sections being mounted to a second member; and
    lodging the sealing member into the cavity of the clamp until the upper and lower arcuate portions are biased against the first and second inner sealing surfaces.

20. The method of claim 19, wherein the sealing member is formed of nested strips and further comprising bolting the strips together at an end distal from the arcuate extensions.

* * * * *